United States Patent [19]

Kuriyama

[11] Patent Number: 5,705,904
[45] Date of Patent: Jan. 6, 1998

[54] FREQUENCY CONVERTER DEVICE WHICH ADAPTIVELY RESPONDS TO A POWER FAILURE

[75] Inventor: Shigemi Kuriyama, Tokyo, Japan

[73] Assignee: Mitsubishi Denki Kabushiki Kaisha, Tokyo, Japan

[21] Appl. No.: 738,078

[22] Filed: Oct. 25, 1996

[30] Foreign Application Priority Data

Mar. 28, 1996  [JP]  Japan ................................. 8-074317

[51] Int. Cl.$^6$ .................................................. H02P 7/63
[52] U.S. Cl. ............................................... 318/439; 318/803
[58] Field of Search ................................. 318/254, 439, 318/138, 132, 799–803; 307/64, 66

[56] References Cited

U.S. PATENT DOCUMENTS

| | | | |
|---|---|---|---|
| 5,212,431 | 5/1993 | Origuchi et al. | 318/139 |
| 5,245,256 | 9/1993 | Cassat et al. | 318/254 |

FOREIGN PATENT DOCUMENTS

| | | |
|---|---|---|
| 0 270 689 | 6/1988 | European Pat. Off. . |
| 55-94583 | 7/1980 | Japan . |
| 7-67328 | 3/1995 | Japan . |
| 2 292 846 | 3/1996 | United Kingdom . |

Primary Examiner—Brian Sircus
Attorney, Agent, or Firm—Sughrue, Mion, Zinn, Macpeak & Seas, PLLC

[57] ABSTRACT

A frequency converter device comprises a first converter 5 in a pulse-width modulation system for converting an AC voltage into a DC voltage; a second converter 2 in a pulse-width modulation system for supplying an AC voltage with a variable voltage and a variable frequency to a motor; a capacitor 15 connected between an output side of said first converter 5 and an input side of said second converter 15; a current suppressing circuit connected to the input side of said first converter 5 and consisting of a resistor 31 and a relay 32; a detection circuit 19 for detecting the presence or absence of the power supply inputted to said first converter 5; a circuit 16 for measuring the voltage across said capacitor 15; a drive control circuit 30a for stopping the conversion of said first converter 5 when power failure of an input power supply occurs and when the voltage across the capacitor is not smaller than a prescribed value, continuing the drive state of the relay 32 and said second converter 2, thereby continuing an output.

7 Claims, 2 Drawing Sheets

FREQUENCY CONVERTER DEVICE WHICH ADAPTIVELY RESPONDS TO A POWER FAILURE

BACKGROUND OF THE INVENTION

1. Field of the Invention

The present invention relates to a frequency converting device which is capable of performing motor driving and recursive braking, and suitable for driving a motor with good power factor of a power supply.

2. Description of the Related Art

Conventionally, for example, JP-A-55-94583 has proposed a frequency converting device related to a frequency converter which can perform recursive driving and improve power factor of power supply and its control method.

FIG. 2 is a view showing a configuration of the conventional frequency converting device. In FIG. 2, reference numeral 2 denotes a PWM inverter using switching (GTO) elements; 3 an induction motor; 5 a voltage-type PWM system converter using switching (GTO) elements; 8 a frequency designating circuit for designating the output frequency and voltage of the inverter 2; 9 an oscillator for oscillating a three-phase sinusoidal wave signal at a variable frequency whose output frequency is proportional to the frequency designating signal from the designating circuit 8.

Reference numeral 10 denotes a multiplier for multiplying each output signal from the designating circuit 8 by that from the oscillator 9; 11 an oscillator for oscillating a triangular carrier wave signal; 12 a comparator for comparing the carrier wave signal with the output signal from the multiplier 10 to produce a pulse-width modulation (PWM) signal; and 13 a gate circuit for producing a gate signal which serves to on/off control switching elements of an inverter 2. As regards the multiplier 10 and comparator 12, although their three sets thereof which is identical to the number of phases are required, two sets thereof will not be illustrated.

Reference numeral 14 denotes a voltage designating circuit for designating a designating signal of a DC output voltage; 15 a capacitor connected to a current output terminal of the converter 5; 15a a DC—DC converter connected to the capacitor; 16 a voltage detector for detecting a voltage across the capacitor 15; 17 a voltage difference amplifier for differentially amplifying the voltage designating signal and the output voltage from the detector 16; 18 a converter for insulating the voltage of an AC voltage connected to the converter 5 to detect an input power phase; 19 a current detector for detecting an AC input current (instantaneous value) of the converter 5; 20 a computing circuit for outputting an instruction signal of the basic component (instantaneous value) of an AC input voltage to the converter 5 on the basis of output signals from the converter 18, detector 19 and amplifier 17; 21 an oscillator for oscillating a triangular carrier signal; 22 a comparator for comparing the outputs from carrier wave signal and the output signal to output a pulse-width modulation signal; 23 a gate amplifier for designating a gate signal on-off controlling the switching of the converter 5.

Reference numeral 30b denotes a drive control circuit for determining the stopping of the PWM inverter 2 and the converter 2 in accordance with the outputs from the converter 18 and the voltage detector 16 to determine the state of the relay described later; 31 a resistor for suppressing the peak value of an initial charging current of the capacitor 15 to a low value when power is supplied to the device to prevent damage of this device at issue and a peripheral circuit; and 32 a relay connected across the resistor 31 and whose "on" or "off" is determined in accordance with the signal from the drive control circuit 30b. The resistor 31 and relay 32 constitute a current suppressing circuit.

The conventional frequency converting device as described above has a problem that when power abnormality such as instantaneous power failure and instantaneous voltage drop occurs, the first converter continues a modulation operation so that during power restoration, an excessive current flows through the input and output and hence the device and its peripheral device may be damaged.

SUMMARY OF THE INVENTION

The present invention has been made in order to solve the above problem, and therefore an object of the present invention is to provide a frequency converting device for determining the state of a current suppressing circuit and the drive state of a converter in accordance with the voltage across a capacitor when instantaneous power failure occurs.

A second object of the invention is to provide a frequency converting device for determining the state of a current suppressing circuit and the drive state of a converter in accordance with the state of the current suppressing circuit, the drive state of the converter and the state of the induction motor after and before power restoration when instantaneous power failure occurs.

A third object of the invention is to provide a frequency converting device for determining the state of a current suppressing circuit and drive state of the converter in accordance with the voltage across a capacitor when an instantaneous voltage drop occurs.

A fourth object of the invention is to provide a frequency converting device for determining the output from the second converter in accordance with the state of the induction motor after power restoration from the state where the power is stopped owing to instantaneous voltage drop and after the first converter is short-circuited and the drive of the first converter is started.

In order to achieve the above objects, the frequency converter device according to the present invention comprises: a first converter in a pulse-width modulation system for converting an AC voltage into a DC voltage; a second converter in a pulse-width modulation system for supplying an AC voltage with a variable voltage and a variable frequency to a motor; a capacitor connected between an output side of said first converter and an input side of said second converter; a current suppressing circuit connected to the input side of said first converter and consisting of a resistor and a short-circuiting means; a detection circuit for detecting the presence or absence of a power supply inputted to said first converter; a circuit for measuring the voltage across said capacitor; a drive control circuit for stopping the conversion of said first converter when power failure of the input power supply occurs and when the voltage across the capacitor is not smaller than a prescribed value, continuing the drive state of the short-circuiting means in said current suppressing circuit and said second converter, thereby continuing an output.

In the frequency converting device according to the present invention, when power failure occurs, said drive control circuit stops the conversion of said first converter, and when the voltage across the capacitor is smaller than a prescribed value, the drive state of the short-circuiting means in said current suppressing circuit and the second converter is changed into a state before power energization.

In the frequency converting device according to the invention, during power restoration after instantaneous power failure occurs when the voltage across a capacitor is not smaller than a prescribed value, said drive control circuit starts conversion of the first converter.

The frequency converting device according to the present invention comprises a residual voltage detector circuit for detecting the rotary speed of an induction motor in terms of a residual voltage generated therefrom, wherein during power restoration after instantaneous power failure occurs when the voltage across a capacitor is smaller than a prescribed value, said drive control circuit, after the voltage across the capacitor is smaller than a prescribed value, short-circuits the short-circuiting means in said current suppressing circuit to start the conversion of said first converter and determines the conversion state of said second converter in accordance with the rotary state of said motor to start the conversion state of said second converter.

In the frequency converter device according to the present invention, when instantaneous voltage drop occurs, said drive control circuit, if the voltage across said capacitor is not smaller than a prescribed value, said drive control circuit continues the state of the short-circuiting means in the said drive control circuit and the conversion states of said first converter and said second converter.

In the frequency converter device according to the present invention, when instantaneous voltage drop occurs, if the voltage across said capacitor is smaller than a prescribed value, said current suppressing circuit opens the short-circuiting means in said current suppressing circuit and stops the conversion of said first converter and said second converter.

The frequency converter device according to the present invention comprises a residual voltage detector circuit for detecting the rotary speed of an induction motor in terms of a residual voltage generated therefrom, wherein after restoration from instantaneous power failure, if the voltage across the capacitor is not smaller than a prescribed value, said drive control circuit short-circuits the short-circuiting means in said current suppressing circuit to start the conversion of said first converter and determines the conversion state of said second converter in accordance with the rotary state of said motor to start the conversion state of said second converter.

The above and other objects and features of the present invention will be more apparent from the following description taken in conjunction with the accompanying drawings.

DETAILED DESCRIPTION OF THE PREFERRED EMBODIMENTS

Now, a description will be given in more detail of embodiments of the present invention with reference to FIG. 1 Embodiment 1

Figure 1:
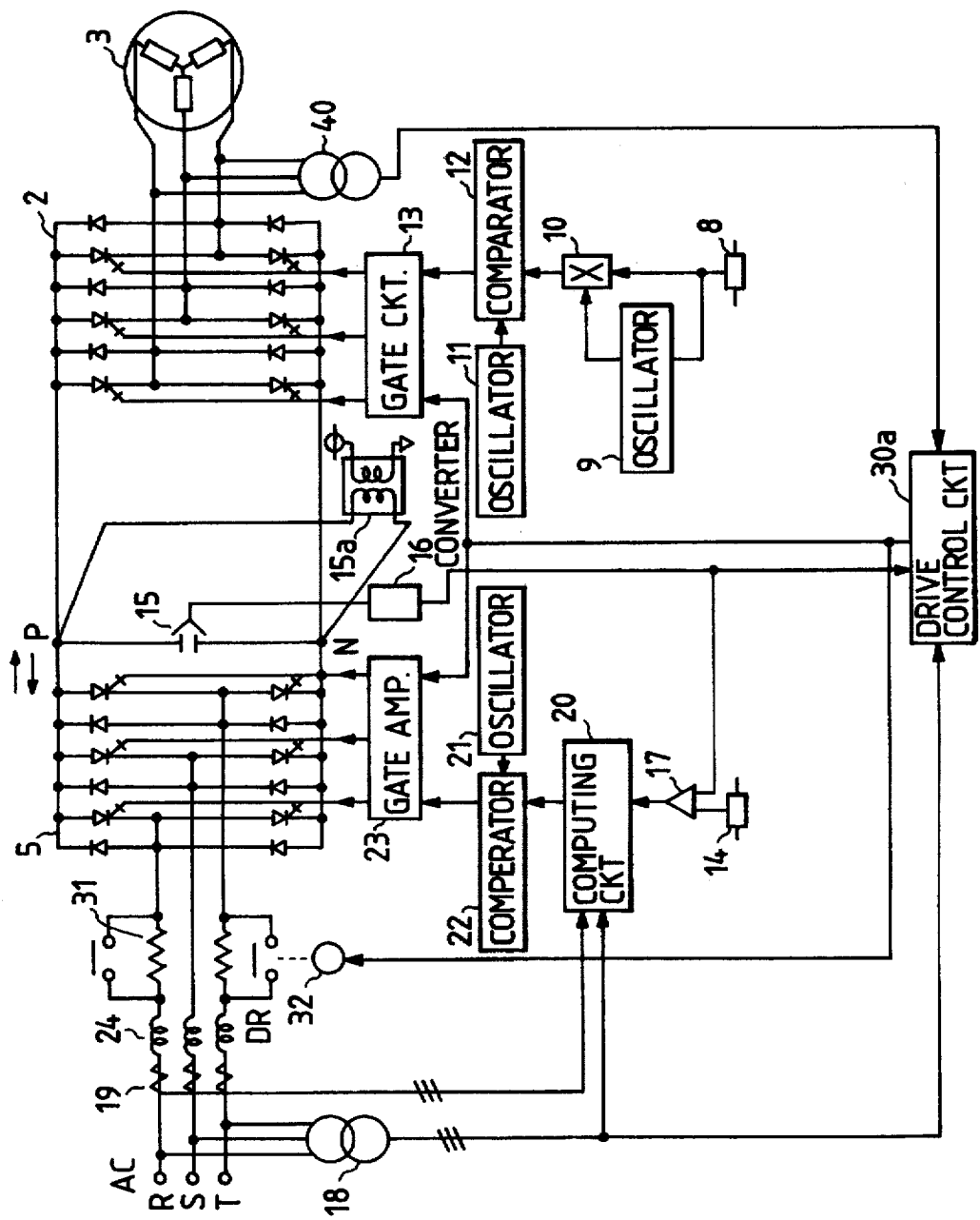
FIG. 1 is a view showing the configuration of a frequency converting device according to an embodiment of the present invention.
Figure 2:
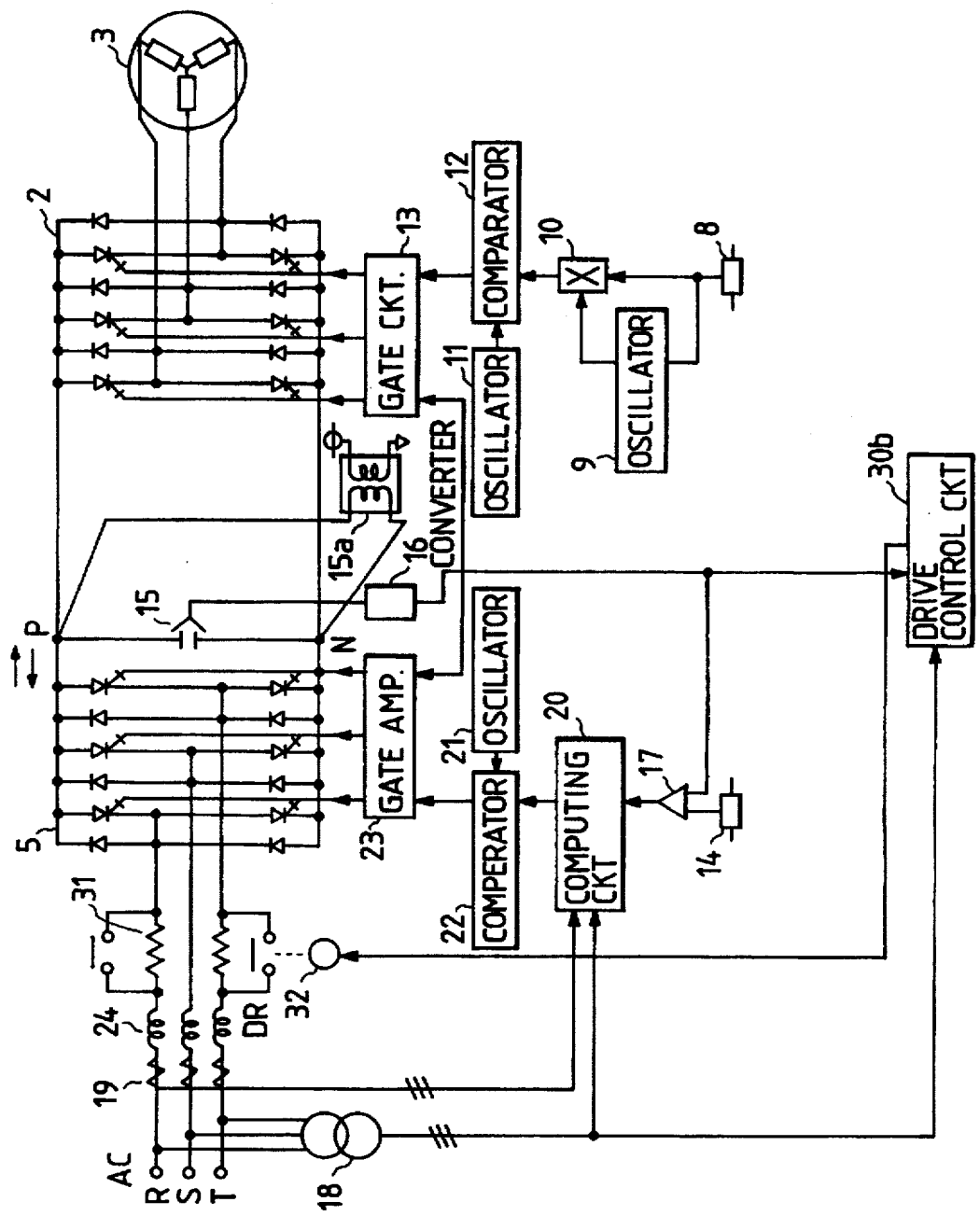
FIG. 2 is a view showing the configuration of a conventional frequency converting device.

FIG. 1 is a view showing the frequency converting device according to the first embodiment of the present invention.

In FIG. 1, reference numeral 2 denotes a PWM inverter using switching (GTO) elements serving as a second converter; 3 an induction motor; 5 a voltage-type PWM system converter using switching (GTO) elements as a first converter; 8 a frequency designating circuit for designating the output frequency and voltage of the inverter 2; 9 an oscillator for oscillating a three-phase sinusoidal wave signal at a variable frequency whose output frequency is proportional to the frequency designating signal from the designating circuit 8; 10 a multiplier for multiplying each output signal from the command circuit 8 by that from the oscillator 9; 11 an oscillator for oscillating a triangular carrier wave signal; 12 a comparator for comparing the carrier wave signal with the output signal from the multiplier 10 to produce a pulse-width modulation (PWM) signal described later; and 13 a gate circuit for producing a gate signal which serves to on/off control a switching element of an inverter 2. As regards the multiplier 10 and comparator 12, although their three sets thereof which is identical to the number of phases are required, two sets thereof will not be illustrated.

Reference numeral 14 denotes a voltage designating circuit for designating a designating signal of a DC output voltage; 15 a capacitor connected to a current output terminal of the converter 5; 15a a DC—DC converter connected to the capacitor; 16 a voltage detector for detecting a voltage from the converter 16; 17 a voltage difference amplifier for differentially amplifying the voltage designating signal and the output voltage from the converter 16; 18 a converter for insulating the voltage of an AC voltage connected to the converter 5 to detect an input power phase; 19 a current detector for detecting an AC input current (instantaneous value) of the converter 5; 20 a computing circuit for producing a designating signal of the basic component (instantaneous value) of an AC input voltage to the converter 5 on the basis of output signals from the converter 18, detector 19 and amplifier 17; 21 an oscillator for oscillating a triangular carrier signal; 22 a comparator for comparing the outputs from carrier wave signal and the output signal to output a pulse-width modulation signal; 23 a gate amplifier for producing a gate signal on-off controlling the switching of the converter 5.

Reference numeral 30a denotes a drive control circuit for determining the stopping of the PWM inverter 2 and the converter 2 in accordance with the outputs from the converter 18 and the voltage detector 16 to determine the state of the relay described later; 31 a resistor for suppressing the peak value of an initial charging current of the capacitor 15 to a low value when power is supplied to the device to prevent damage of this device at issue and a peripheral circuit; and 32 a relay connected across the resistor 31 and whose "on" or "off" is determined in accordance with the signal from the drive control circuit 30b; 40 a residual voltage detecting circuit for detecting the residual voltage generated from an induction motor.

An explanation will be given of the operation of the frequency converting device according to the present invention. First, when power is supplied into the frequency converting device, a current charging the resistor 32 through the resistor 32 flows. When the voltage across the capacitor 15 reaches a certain value, the DC—DC converter 15a starts the output of the control power supply so that the drive control circuit 30a short-circuits the resistor 31 through the relay 32. Thereafter, the switching state of each of elements of the converter 5 is determined by the comparator 22 so that the input voltage has the same phase as the input current. In accordance with the signal indicative of the switching state, the converter 5 is driven. On the other hand, the PWM converter 2, after the relay 32 is short-circuited, controls its switching elements in accordance with the designation state of the designating circuit 8 to control the drive state of the induction motor 3.

In this state, when instantaneous power failure occurs, the detector 19 for detecting the input voltage detects power failure of the input power supply and stops the conversion of the converter 5. If the voltage across the capacitor 15 is equal to or larger than a prescribed value, the drive of the PWM inverter 2 is continued and the relay 32 maintains the short-circuiting of the relay 32. When the voltage across the capacitor 15 is reduced to become smaller than a predetermined value, the relay 31 is opened and the output from the PWM inverter is also stopped.

After restoration from instantaneous power failure, if the drive of the PWM inverter 2 is continued, the converter 5 starts the conversion operation. If the drive of the PWM inverter 2 is stopped, after it is detected that the voltage across the capacitor 15 reaches a prescribed value, the relay 31 is short-circuited so that the output from the PWM inverter 2 is started.

In this case, while the drive of the PWM inverter 2 remains stopped during power failure, the induction motor 3 may be rotating due to its inertial force. Before the output from the PWM inverter 2 is started, the rotary speed of the induction motor 3 is detected in terms of the residual voltage detecting circuit 40 for detecting the residual voltage which is produced from the induction motor. Thus, the output from the PWM inverter 2 is determined in accordance with the rotary speed to start the drive of the PWM inverter 2.

On the other hand, when instantaneous voltage drop occurs, this fact can be decided by the converter 18 in terms of that the input current is normal and the voltage across the capacitor 15 has been lowered.

In this case, if the input voltage is not smaller than a prescribed voltage, the conversion operation of the converters 2 and 5 is continued. If the input voltage is smaller than the prescribed value, the relay 32 is opened to stop the conversion operation of the converter 5 and the PWM inverter 2.

When the voltage across the capacitor 15 reaches a constant value owing to subsequent power restoration, the relay 32 is short-circuited to start the conversion operation of the converter 5, thereby starting the output from the PWM inverter. As described above, while the drive of the PWM inverter 2 remains stopped during power failure, the induction motor may be rotating due to its inertial force. Before the output from the PWM inverter 2 is started, the rotary speed of the induction motor 3 is detected in terms of the residual voltage detecting circuit 40 for detecting the residual voltage which is produced from the induction motor 3. Thus, the output from the PWM inverter 2 in accordance with the rotary speed to start the drive of the PWM inverter.

As the present invention has been constructed as described above, the following advantages can be obtained.

When instantaneous power failure occurs, the state of the current suppressing circuit and the drive state of the converter can be determined in accordance with the voltage across the capacitor so that a frequency converter apparatus with high input power factor can be provided which can detect power abnormality to be protected, and can continue the rotation of the motor for a longer time.

The drive state of a current suppressing circuit and the drive state of the converter are determined in accordance with the state of the current suppressing circuit, the drive state of the converter and the state of the induction motor after and before power restoration when instantaneous power failure occurs. Thus, a frequency converting device with high input power factor can be provided which can smoothly carry out the drive of the motor at the time of power restoration.

The state of a current suppressing circuit and drive state of the converter can be determined in accordance with the voltage across a capacitor when an instantaneous voltage drop occurs. Thus, a frequency converter apparatus with high input power factor can be provided which can detect power abnormality to be protected, and can continue the rotation of the motor for a longer time.

The output from the second converter can be determined in accordance with the state of the induction motor after power restoration from the state where the power is stopped owing to instantaneous voltage drop and after the first converter is short-circuited and the drive of the first converter is started. Thus, a frequency converting device with high input power factor can be provided which can smoothly carry out the drive of the motor at the time of power restoration.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A frequency converter device, comprising:
   a first converter in a pulse-width modulation system for converting an AC voltage into a DC voltage;
   a second converter in a pulse-width modulation system for supplying an AC voltage with a variable voltage and a variable frequency to a motor;
   a capacitor connected between an output side of said first converter and an input side of said second converter;
   a current suppressing circuit connected to the input side of said first converter and consisting of a resistor and a short-circuiting means;
   a detection circuit for detecting the presence or absence of a power supply inputted to said first converter;
   a circuit for measuring the voltage across said capacitor;
   a drive control circuit for stopping the conversion of said first converter when power failure of the input power supply occurs and when the voltage across the capacitor is not smaller than a prescribed value, continuing the drive state of the short-circuiting means in said current suppressing circuit and said second converter, thereby continuing an output.

2. A frequency converting device according to claim 1, wherein when power failure occurs, said drive control circuit stops the conversion of said first converter, and when the voltage across the capacitor is smaller than a prescribed value, the drive state of the short-circuiting means in said current suppressing circuit and the second converter is changed into a state before power energization.

3. A frequency converting device according to claim 1, wherein during power restoration after instantaneous power failure occurs when the voltage across a capacitor is not smaller than a prescribed value, said drive control circuit starts conversion of the first converter.

4. A frequency converting device according to claim 1, further comprising a residual voltage detector circuit for detecting the rotary speed of an induction motor in terms of a residual voltage generated therefrom, wherein during power restoration after instantaneous power failure occurs the voltage across a capacitor is smaller than a prescribed value, said drive control circuit short-circuits the short-circuiting means in said current suppressing circuit to start the conversion of said first converter and determines the conversion state of said second converter in accordance with the rotary state of said motor to start the conversion state of said second converter.

5. A frequency converter device according to claim 1, wherein when instantaneous voltage drop occurs, said drive control circuit, if the voltage across said capacitor is not smaller than a prescribed value, said drive control circuit continues the state of the short-circuiting means in the said drive control circuit and the conversion states of said first converter and said second converter.

6. A frequency converter device according to claim 1, wherein when instantaneous voltage drop occurs, if the voltage across said capacitor is smaller than a prescribed value, said current suppressing circuit opens the short-circuiting means in said current suppressing circuit and stops the conversion of said first converter and said second converter.

7. A frequency converter device according to claim 6, further comprising a residual voltage detector circuit for detecting the rotary speed of an induction motor in terms of a residual voltage generated therefrom, wherein after restoration from instantaneous power failure, if the voltage across the capacitor is not smaller than a prescribed value, said drive control circuit short-circuits the short-circuiting means in said current suppressing circuit to start the conversion of said first converter and determines the conversion state of said second converter in accordance with the rotary state of said motor to start the conversion state of said second converter.

* * * * *